US011750603B2

(12) United States Patent
Holz

(10) Patent No.: US 11,750,603 B2
(45) Date of Patent: Sep. 5, 2023

(54) SYSTEM AND METHOD FOR AUTHENTICATING USERS ACROSS DEVICES

(71) Applicant: VERIZON PATENT AND LICENSING INC., Basking Ridge, NJ (US)

(72) Inventor: Christian Holz, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 585 days.

(21) Appl. No.: 14/717,013

(22) Filed: May 20, 2015

(65) Prior Publication Data
US 2016/0344730 A1  Nov. 24, 2016

(51) Int. Cl.
G06Q 30/02 (2023.01)
H04L 9/40 (2022.01)
G06Q 30/0241 (2023.01)

(52) U.S. Cl.
CPC ..... H04L 63/0876 (2013.01); G06Q 30/0277 (2013.01); H04L 63/0428 (2013.01); H04L 63/0853 (2013.01); H04L 63/0861 (2013.01)

(58) Field of Classification Search
CPC ............ H04L 63/0876; H04L 63/0428; H04L 63/0853; H04L 63/0861; G06Q 30/0207–30/0277
See application file for complete search history.

(56) References Cited

U.S. PATENT DOCUMENTS

| | | | | |
|---|---|---|---|---|
| 8,627,438 | B1 * | 1/2014 | Bhimanaik | G06F 21/36 726/9 |
| 9,264,419 | B1 * | 2/2016 | Johansson | H04L 63/0853 |
| 9,355,231 | B2 * | 5/2016 | Disraeli | G06F 21/31 |
| 9,426,151 | B2 * | 8/2016 | Richards | H04L 63/0861 |
| 9,614,829 | B1 * | 4/2017 | Molina-Markham | H04W 12/082 |
| 9,667,610 | B2 * | 5/2017 | Theebaprakasam | H04L 63/102 |
| 10,009,355 | B2 * | 6/2018 | Ramalingam | G06F 21/35 |
| 2008/0209213 | A1 * | 8/2008 | Astrand | H04L 63/18 713/168 |
| 2009/0132813 | A1 * | 5/2009 | Schibuk | G06Q 20/223 713/158 |
| 2009/0320125 | A1 * | 12/2009 | Pleasant, Jr | G06F 21/31 726/17 |

(Continued)

Primary Examiner — Thuy N Nguyen

(57) ABSTRACT

Disclosed are systems and methods for improving interactions with and between computers in an authentication system supported by or configured with personal computing devices, servers and/or platforms. The systems interact to identify and retrieve data across platforms, which data can be used to improve the quality of data used in processing interactions between or among processors in such systems. The disclosed systems and methods enable users to access web-based resources on a first device by authenticating themselves on a second device. A user can provide identifying information to a web-based resource on a first device, and as a result, the user receives a message at his/her already registered second device. The user then authenticates himself/herself on the second device by reusing the means of authentication that exist on the user's second device, which results in the user being granted entry to the web-based resource on the first device.

17 Claims, 14 Drawing Sheets

(56) References Cited

U.S. PATENT DOCUMENTS

| | | | | |
|---|---|---|---|---|
| 2011/0145897 A1* | 6/2011 | Tyree | ............... | G06F 21/42 |
| | | | | 726/6 |
| 2012/0124656 A1* | 5/2012 | Senac | ............... | H04L 9/3213 |
| | | | | 726/9 |
| 2013/0091544 A1* | 4/2013 | Oberheide | ............... | G06F 21/34 |
| | | | | 726/1 |
| 2013/0205380 A1* | 8/2013 | Avni | ............... | H04L 63/08 |
| | | | | 726/7 |
| 2014/0208406 A1* | 7/2014 | Austin | ............... | H04L 63/02 |
| | | | | 726/7 |
| 2014/0214673 A1* | 7/2014 | Baca | ............... | G06Q 20/363 |
| | | | | 705/44 |
| 2015/0121482 A1* | 4/2015 | Berman | ............... | H04L 63/10 |
| | | | | 726/5 |
| 2015/0121496 A1* | 4/2015 | Caldeira De Andrada | ............... | |
| | | | | H04L 63/08 |
| | | | | 726/7 |
| 2016/0094550 A1* | 3/2016 | Bradley | ............... | G06F 21/32 |
| | | | | 726/7 |
| 2016/0241658 A1* | 8/2016 | Fryc | ............... | H04L 69/329 |
| 2016/0337351 A1* | 11/2016 | Spencer | ............... | H04L 63/0876 |
| 2018/0115897 A1* | 4/2018 | Einberg | ............... | G07C 9/28 |
| 2018/0268402 A1* | 9/2018 | Agrawal | ............... | G06Q 20/425 |
| 2018/0270226 A1* | 9/2018 | Agrawal | ............... | G06F 21/32 |

* cited by examiner

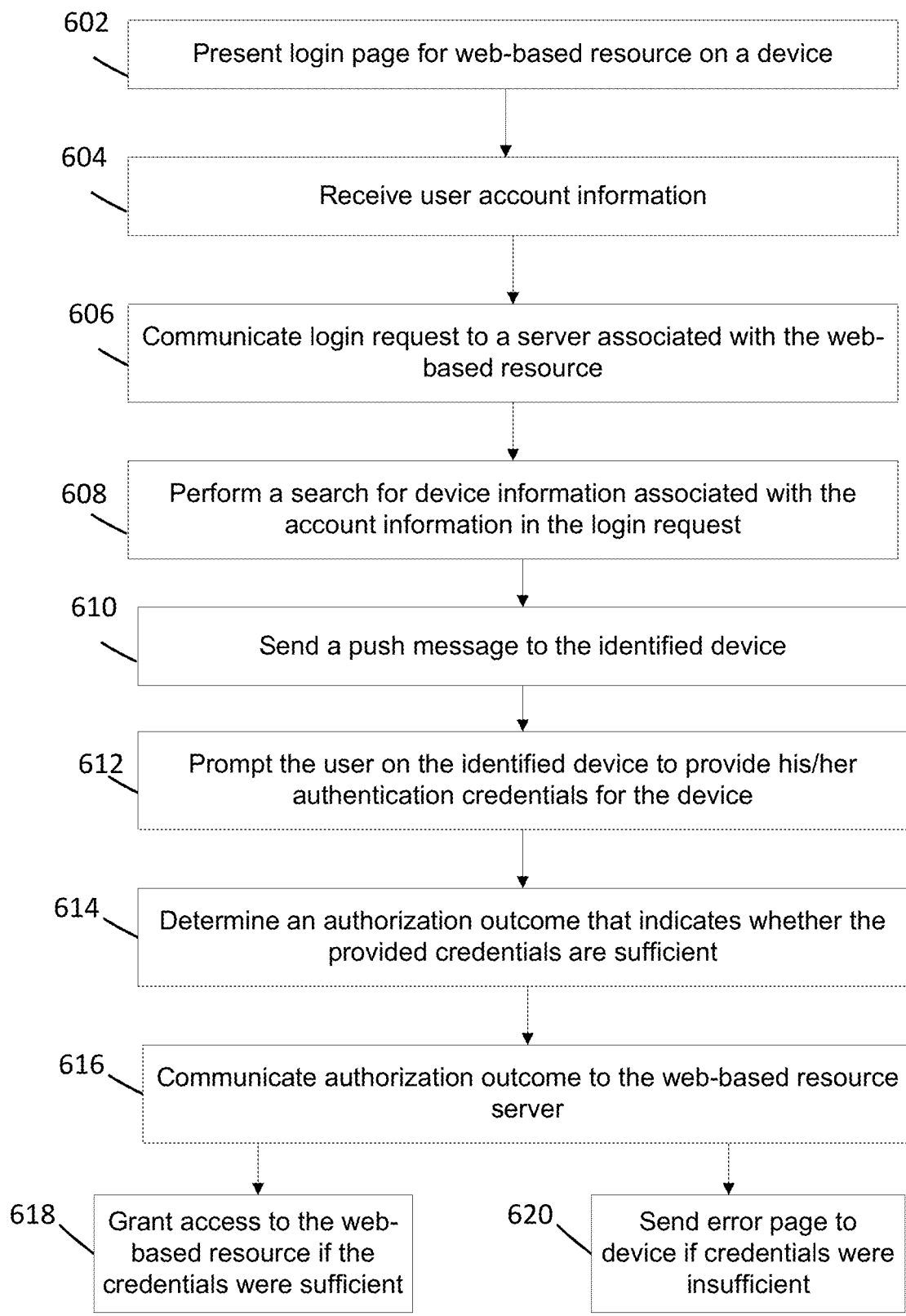

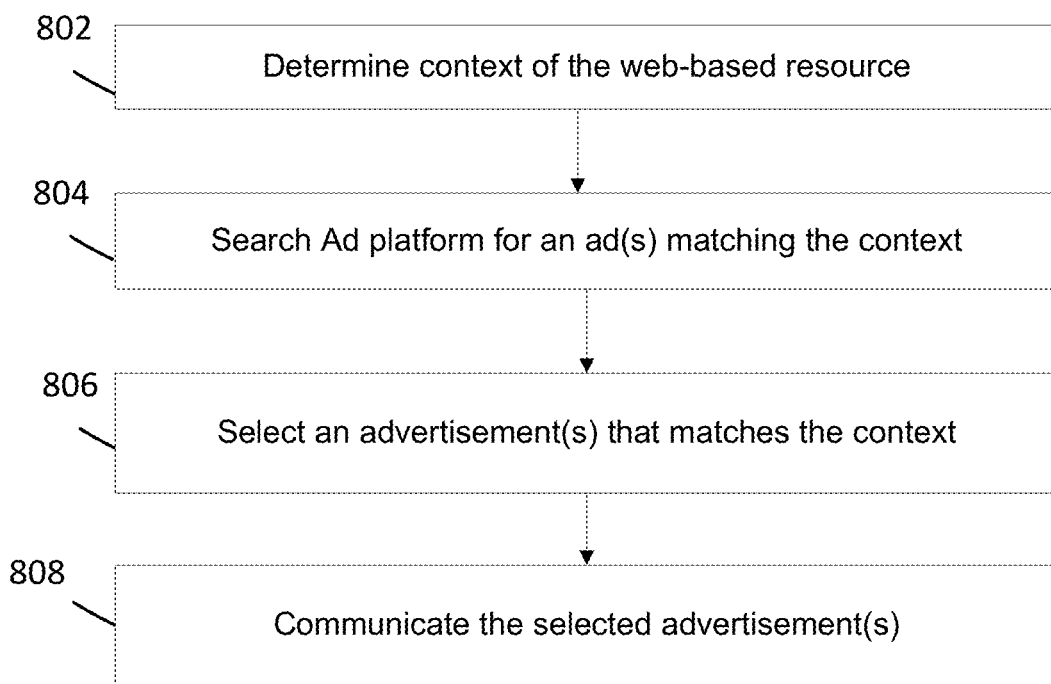

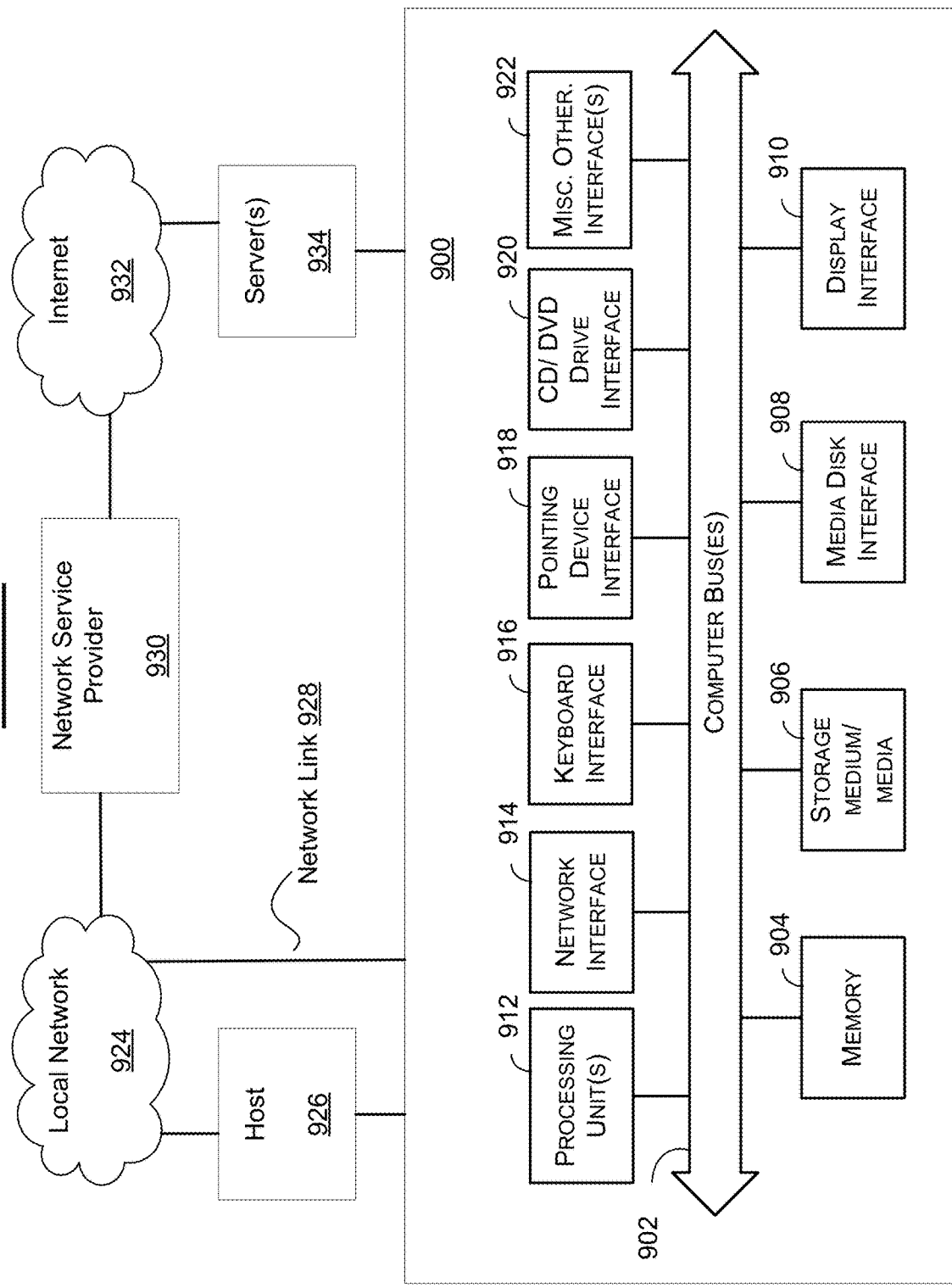

SYSTEM AND METHOD FOR AUTHENTICATING USERS ACROSS DEVICES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of authentication server systems and/or platforms by modifying the capabilities and enabling non-native functionality to such systems and/or platforms to perform user authentication over a network via a user's device.

SUMMARY

The present disclosure provides systems and methods for authenticating users on a network entirely via the users' personal or second device. According to some embodiments of the present disclosure, a user can access (or log-in to) a web-based resource without the use of a password. In some embodiments, the user can identify himself/herself to the web-based resource by entering a username (or any other type of identifying or account information) on a first computing device, and as a result, the user receives a message at his/her already registered second computing device (i.e., mobile device). The message prompts the user to authenticate himself/herself on the second user device by reusing the means of authentication that exist on such device. Such authentication is then communicated to the web-based resource which results in the user being granted entry.

In accordance with one or more embodiments, a method is disclosed which includes receiving, at a computing device over a network, an access request to access a secure resource from a first device; identifying, via the computing device, device information of a second device associated with the user based on the access request, the device information comprising an identifier for communicating with the second device; communicating, via the computing device, a message to the second device based on the identifier, the message prompting authentication of the user via the second device; receiving, via the computing device over the network, an outcome determination from the second device, the outcome determination indicating whether the authentication is sufficient to permit access to the second device; and communicating, via the computing device, a response to the access request to the first device based on the outcome determination. According to some embodiment, the response comprises access to the secure resource when the outcome determination indicates that the authentication is sufficient to permit access to the second device. According to some embodiment, the response comprises an error message when the outcome determination indicates that the authentication is insufficient to permit access to the second device.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for performing user authentication over a network via a user's device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a flowchart illustrating steps performed in accordance with some embodiments of the present disclosure;

FIG. 8 is a flowchart illustrating steps performed in accordance with some embodiments of the present disclosure; and FIG. 9 is a block diagram illustrating architecture of a hardware device in accordance with one or more embodiments of the present disclosure.

DESCRIPTION OF EMBODIMENTS

Figure 1:
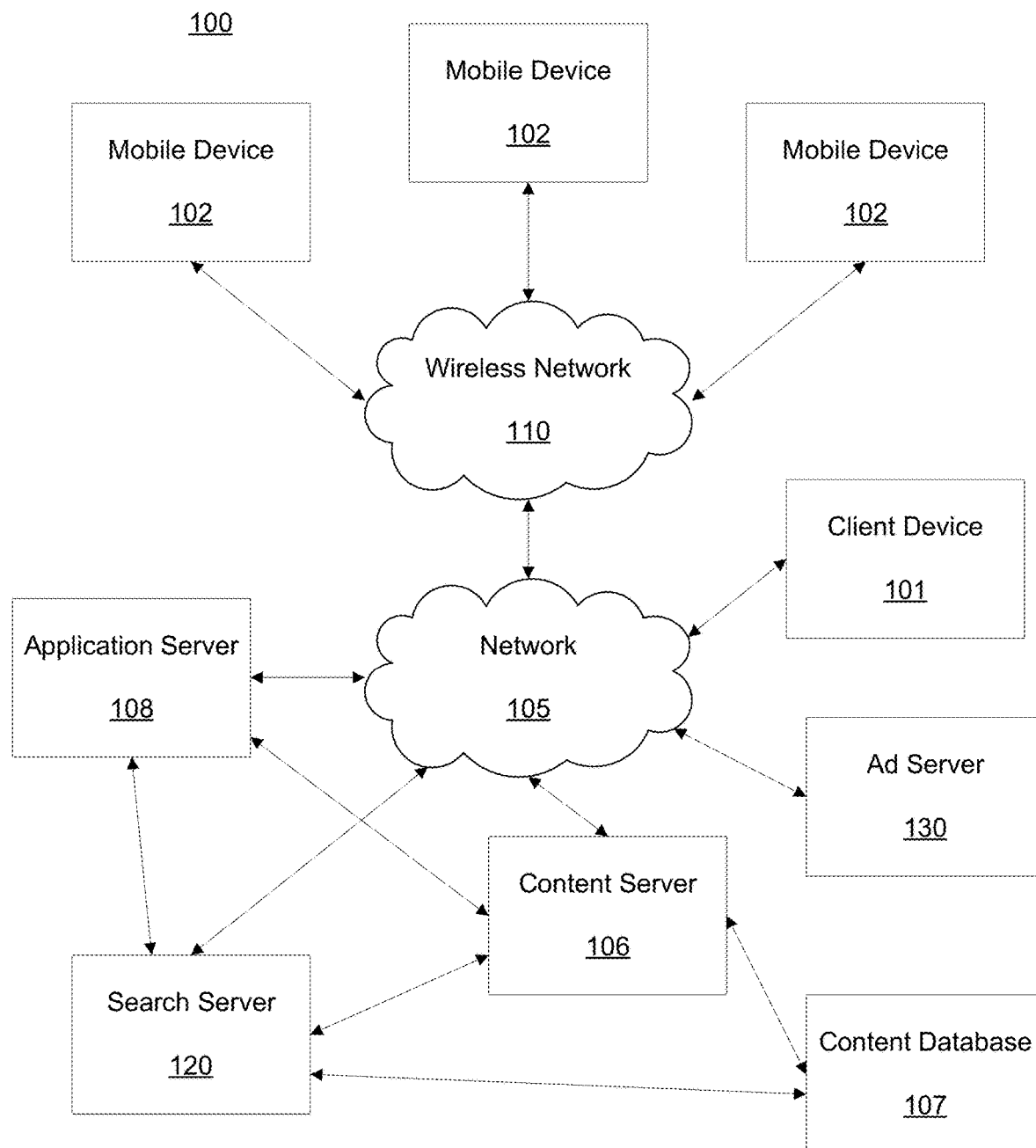
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known or to become known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more sensors, accelerometers, one or more gyroscopes, global positioning system (GPS) or other location-identifying type capability, or a display with a high degree of functionality, such as a touch-sensitive high resolution color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, current web-based resources mainly rely on users entering username and password combinations to login. That is, in order for a user to gain entry or access to a web-based resource, the user must enter an associated username and password combination. More advanced systems exist that incorporate a previously associated (and thus trusted) mobile device as a second factor for the login, or generate and send a one-time password to the mobile device. In such cases, the user types the second-factor code or the one-time password into the web login form, thereby closing the loop which effectuates entry for the user.

The present disclosure discloses more streamlined, efficient and technically advanced systems and methods for authenticating users. The disclosed systems and methods enable a user to login (or gain access/entry) to web-based resources, platforms, systems and/or services on a first computing device by authenticating the user's identity on a second computing device (e.g., the user's client or personal device).

As discussed herein, web-based resources are secure resources, and are to be understood to include, and are not limited to, any resource on the Internet, intranet, a network or any other location, such as, but not limited to, web pages, web sites, web platforms, applications and/or services hosted by backend servers, cloud-based systems and/or other types of known or to be known web-based platforms, and any other type of online platform, system or service that requires a user to enter a type of personal credential to gain access. For example, a non-limiting web-based resource for purposes of this disclosure can be web-mail, such as Yahoo! Mail®. Thus, as discussed in more detail below, the user can access his/her Yahoo! Mail®. account on a first device, without entering a password, by simply authenticating him/herself on a second device. According to some embodiments, the resources need not be web-based, as they can be locally stored resources on a connected drive, disk, or other type of local storage or retrieval point. For purposes of this disclosure, reference will be made to web-based resources; however, each embodiment should be understood to refer to any type of resource that is accessible by a computing device, either with or without a browser or application program.

According to embodiments of the present disclosure, a user can access (or log in to) a web-based resource without the use of a password. That is, the user can identify himself/herself to the web-based resource by entering a username (or any other type of identifying information) on a first device, and as a result, the user receives a message at his/her already registered second device (i.e., mobile device). According to some embodiments, such message is a push message sent from the server (e.g., backend server) hosting the web-based resource. This push message is pushed to the user's second device which prompts the user to authenticate himself/herself. According to some embodiments of the present disclosure, such prompt requires the user to reuse the means of authentication that exist on the user's device. For example, if the second device requires the user to enter a four (4) digit pin to gain access to the device from the "lock" screen (as with iPhone® devices), then the user will be required to enter such pin. As such, after authentication on the user's second device, a message is then communicated back to the web-based resource (e.g., backend server hosting the system) which indicates that the user is "who he/she says he/she is" (or is authenticated), whereby the user is granted entry to the web-based resource on the first device.

According to some embodiments, the means of authentication that a user utilizes on his/her device can include, but are not limited to, entering a pin code or other character sequence provided by the web-based resource or user device (e.g., a PIN), a character sequence or other type of log-in credential entry set by the user, system administrator or device for accessing the user device, providing biometric information (e.g., fingerprints, iris scan, facial recognition, voice recognition, or other biometrics), and the like.

Therefore, according to some embodiments, the disclosed systems and methods perform a two-step (or factor) user authentication without the use of a conventional username and password combination. The present disclosure enables the use of the user's previously-registered mobile device as a first factor, and authentication on that same device as the second factor. The disclosed systems and methods provide a more secure approach to user authentication occurring in login systems that are bounded by the confines of a web browser.

According to some embodiments, the disclosed systems and methods utilize the user's personal mobile device to authenticate the user, as such devices possess a wealth of sensor components, including cameras and biometric scanners that enable and assist in thwarting hacking attempts and/or identity "spoof" attempts. The disclosed systems and methods' reliance on the (biometric) sensors of known and to be known mobile devices remedies the shortcomings of conventional web browser login/authentication by providing a technical solution that substantially increases the functional capabilities of login systems for web-based resources.

Figure 3:
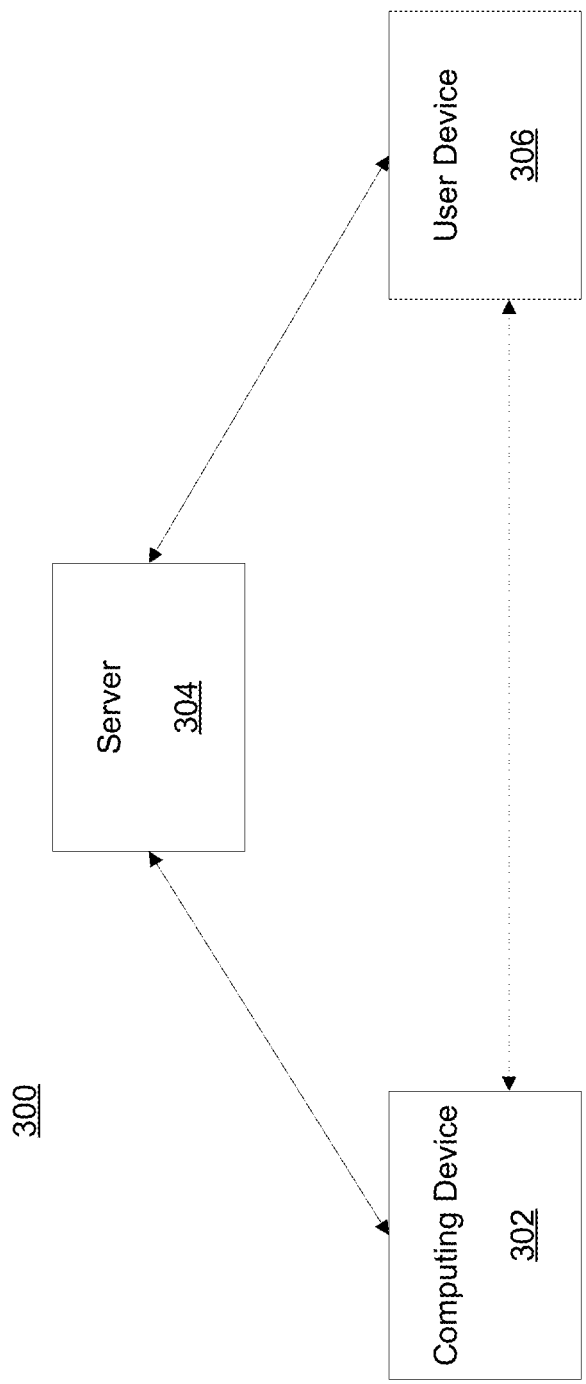
FIG. 3 depicts a non-limiting block diagram example of a login procedure and components required for such in accordance with some embodiments of the present disclosure.

By way of a non-limiting example, as illustrated in FIG. 3, the disclosed systems and methods provide a login procedure 300 for authenticating a user attempting to access a web-based resource. The discussion of FIG. 3 herein is solely for explanatory purposes, as the detailed discussion of the disclosed systems and methods of the present disclosure will be discussed in more detail blow.

As in FIG. 3, user Bob types his username into a web form in a browser or application running on a computing device 302. Bob is attempting to login to his Flickr® account by accessing the Flickr website on his computer 302. Computing device 302, for purposes of this example is, but is not limited to, a desktop computer, personal computer, laptop or workstation. As discussed above and in more detail below, computing device 302 can be virtually any type of stationary or mobile computing device (as discussed in more detail below in reference to device 101 in FIG. 1), for example, a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

Continuing with the example from FIG. 3, upon Bob entering his username, the browser communicates (e.g., forwards/sends) the username to server 304 that hosts the account information for Flickr® (e.g., Yahoo!®'s backend server that hosts the Flickr® site). The Yahoo!® server then sends a message (i.e., a push message) to Bob's mobile device 306. As discussed in more detail below, Bob's mobile device 306 has been previously linked/registered to his Flickr® (or Yahoo!®) account and therefore is "trusted." As discussed above and in more detail below, mobile device 306 can be virtually any type of personal user device (as discussed in more detail below in reference to device 102 in FIG. 1).

The push message from server 304 to mobile device 306 prompts Bob to authenticate himself via the standard means for authenticating himself on the device 306. According to some embodiments, the push message can be linked to an associated application (or program) running on Bob's device 306. For example, if Bob has a Flickr® application installed on his device 306, then the push message is sent from server 304 to Bob's device 306 with the intent of triggering and activating the Flickr® application to provide the prompt to Bob. In another example, as discussed in more detail below, Bob may have a dedicated authentication application installed on his device 306 that has the sole purpose of receiving such push messages and performing local device authentication, or the device might be configured to receive push messages on a home or lock screen, for example in a manner used on iOS devices.

As discussed in more detail below, the prompt requests Bob to authenticate himself. In some embodiments, Bob can authenticate himself by reusing the means of authentication that exits on his device 306. For example, Bob can enter device 306's PIN code or biometric information (e.g., fingerprint=TouchID™). Thus, Bob can authenticate himself to Flickr® through a login (or "unlock") procedure that is already known and trusted by Bob's device 306 and by Bob.

In response to Bob entering his PIN code, for example, Bob's device 306 (or the Flickr® application installed/running on Bob's device 306) responds to the push message by sending the outcome of the authentication to the server 304. If the authentication from Bob was successful (or approved), the server 304 then sends an updated page to the browser/application running on device 302, thereby logging Bob into the requested web-based resource. The updated page can be, for example, the home screen for Bob's Flickr® account, or any other page that is presented when a user is granted access to a web-based resource.

According to embodiments of the present disclosure, all communication occurring between device 302, server 304 and device 306 is encrypted in order to avoid the possibility of unwanted access, alteration or corruption of user account and login information, but such encryption is not mandatory. That is, for security of the information contained within communicated messages during the login/authorization systems and methods discussed herein and for security of information associated with users of such web-based resources, messages may be secured by using any known or to be known negotiated encryption key or a pre-defined encryption key. Such encryption may occur at a sending device, receiving device and/or communicating server(s), or some combination thereof.

According to some embodiments, instead of the server 304 sending a push message to the user prompting the user to enter "login" credentials native to the mobile device 306, the server 304 can generate a unique/one-time, random code (or numerical/character string) and send the code to the client device. The code can be sent as a standard communication message, such as an email, SMS, MMS, and the like, or can be sent as a push notification to the user's device 306. The user can then enter the code received at his/her device 306 in a form displayed on the computing device 302 (which is enabled via a prompt displayed on the login screen in accordance with the username prompt, or as a result of the username of the user being entered and confirmed by the server 304). The browser/application running on device 302 then sends the code to the server 304 for authentication/confirmation. Such embodiment of entering a code received at a mobile device 306 in a web-based form presented on device 302 is represented by the "dotted-line" in FIG. 3 connecting device 302 and 306.

According to some embodiments, the server 304 does not send a code to the mobile device (for subsequent entry by the user on device 302); instead, the mobile device 306 is instructed by the server 304 to generate a unique/one-time, random code that can be entered on the device 302, as above. Such code generation may occur automatically in response to receiving the instruction message from the server 304. In some embodiments, mobile device 306 code generation may require a dedicated application that generates such code generation. In some embodiments, a binary sequence or other type of internal/local message may be utilized to generate such unique code.

According to some embodiments, if the mobile device 306 is "unlocked" or is otherwise not protected by any PIN code or TouchID™, and the like, the disclosed systems and methods can utilize application specific codes/passwords. From the above example, if Bob's device 306 is unlocked, Bob may be prompted to enter his login PIN/password associated with the Flickr® application running on his device 306. In some embodiments, such login credentials may be one-time passwords/codes that are generated for the purpose of securely enabling access to the web-based resource.

According to some embodiments, if device 306 is a wearable device, such as a smart watch, the smart watch device 306 could simply offer a "yes/no" button (or input) for logging in on device 302. This requires the user/owner of the watch device 306 to have previously authenticated the watch as a "paired" device with another mobile device (in a similar manner the Apple iPhone® can be connectively paired with an Apple Watch®). In some embodiments, the "yes/no" input on a paired device can also be required in addition to entering the authentication (e.g., PIN) on the paired device, which acts as a secondary (or third factor) in the disclosed authentication/login procedure.

The disclosed systems and methods provide key advantages to conventional login systems/procedures by ensuring secure, efficient and streamlined authentication of users on web-based resources. The disclosed systems and methods utilize the frequently-performed authentication occurring on user's mobile devices (which users now commonly carry with them everywhere). The disclosed systems and methods replace authentication occurring in the web browser on a computing device (e.g., laptop, workstation, and the like) with authentication on a mobile phone. As a result, the users do not need to remember a plurality of passwords, nor do the users need to concern themselves with changing such passwords frequently to avoid their account from being hacked.

As discussed in more detail below, according to some embodiments, information associated with or derived from the web-based resource the user is requesting access to, as discussed herein, can be used for monetization purposes and targeted advertising when providing access to such systems or platforms. That is, providing targeted advertising to users associated with the systems they are requesting access to and/or or being granted access to can lead to an increased click-through rate (CTR) of such ads and/or an increase in the advertiser's return on investment (ROI) for serving such content provided by third parties (e.g., advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, search server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including, but not limited to, 2nd (2G), 3rd (3G), and/or 4th (4G) generation radio access for cellular systems (and/or other advances in such technology including, for example, $5^{th}$ (5G) generation radio access), WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-102. In some embodiments, applications, such as a search application (e.g., Yahoo! Search®, and the like), can be hosted by the application server 108 (or search server 120). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
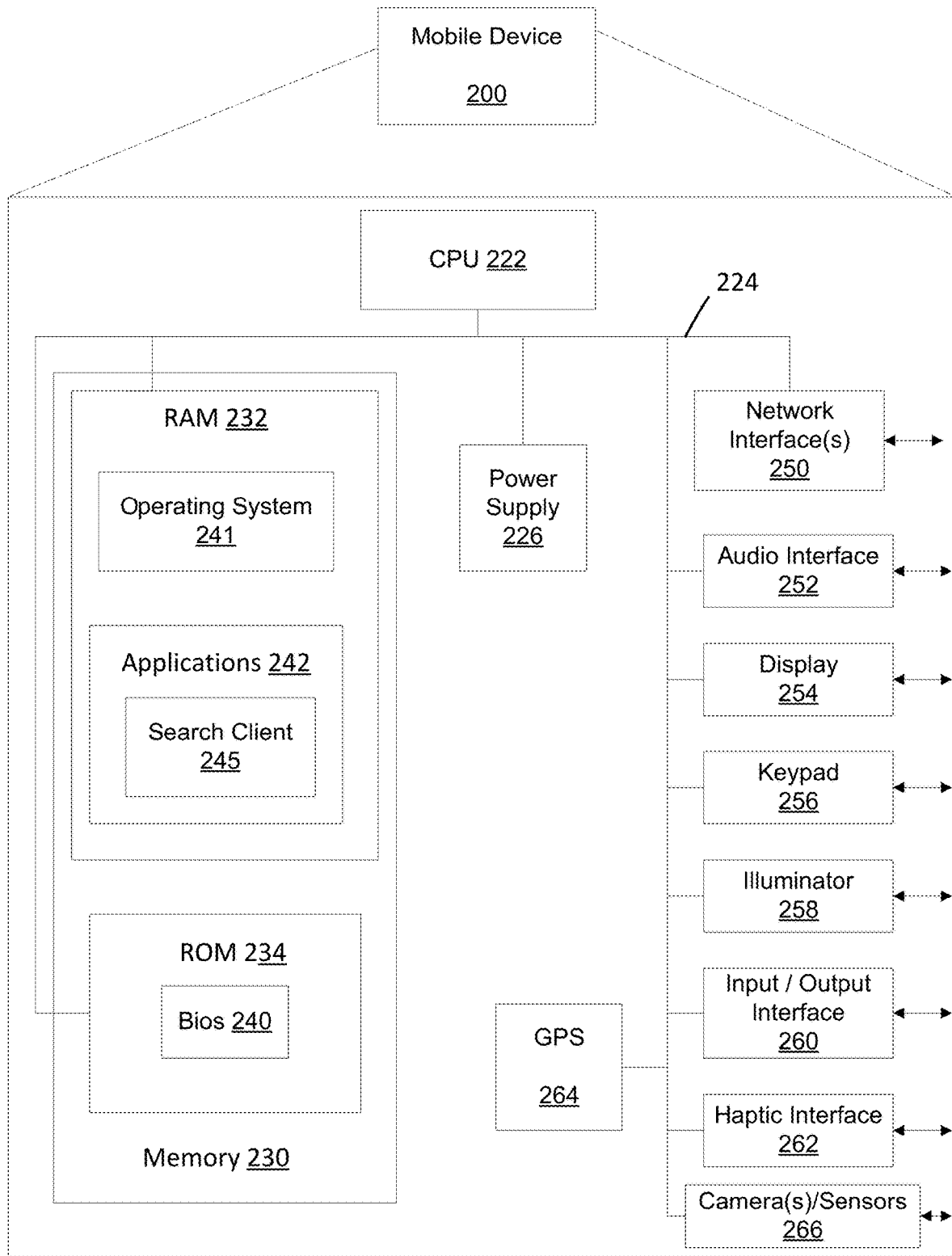
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical or electromagnetic sensors 266. Device 200 can include one camera 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

Figure 4:
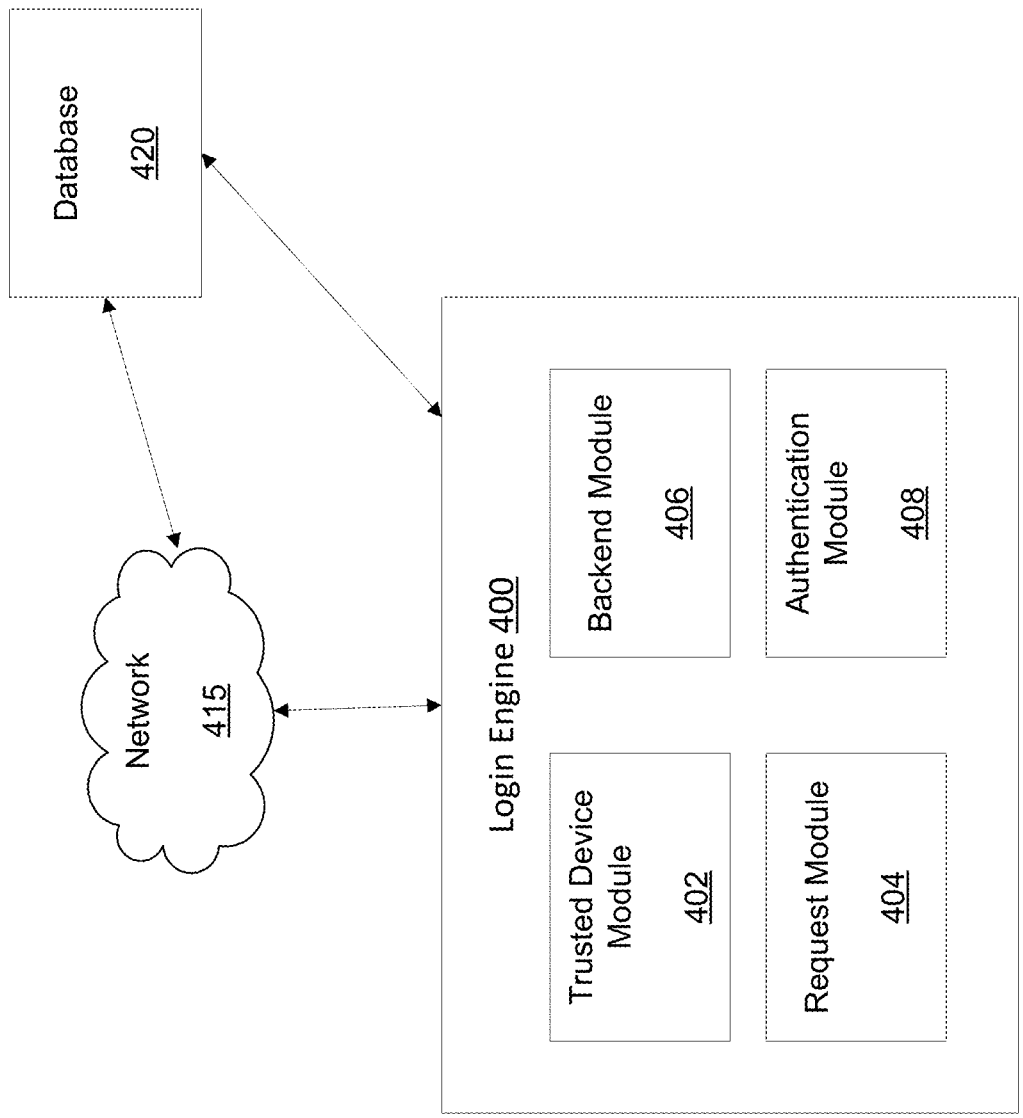
FIG. 4 is a schematic block diagram illustrating components of a system in accordance with some embodiments of the present disclosure.

FIG. 4 is a block diagram illustrating the components for performing the systems and methods discussed herein. FIG. 4 includes a login engine 400, network, 415 and database 420. The login engine 400 can be a special purpose machine or processor and could be hosted by an application server, web server, search server, content provider, email service provider, ad server, user's computing device, and the like, or any combination thereof. The database 420 can be any type of database or memory, and can be associated with a server on a network which is providing the platform the user is requesting access (e.g., content server 106 or application server 108 from FIG. 1; or server 304 from FIG. 3, for example).

The database 420 comprises a dataset of information associated with login credentials for web-based resources and information associated with trusted devices, as discussed in more detail below. The login credential information can include, but is not limited to, a user's profile information, a username, password, demographic information, biographic information, and the like, or some combination thereof. The trusted device information can include, but is not limited to, the device's owner information, voice/data carrier information, "unlocking" credentials (for example, PIN or TouchID™), IP address, and/or any other type of information to identify, confirm and/or authenticate a device, or some combination thereof. In some embodiments, the login credential information and trusted device information, per user, can be stored in database 420 as a linked dataset, so that, for example, when a username is entered, the associated device can be identified, and/or the device's authentication code can be matched to it thereby enabling authentication of a user, as discussed in more detail below. It should be understood that the data (and metadata) in the database 420 can be any type of user and/or device information and type, whether known or to be known, without departing from the scope of the present disclosure.

As discussed above, with reference to FIG. 1, the network 415 can be any type of network such as, but not limited to, a wireless network, a local area network (LAN), wide area network (WAN), the Internet, or a combination thereof. The network 415 facilitates connectivity of the login engine 400, and the database of stored resources 420. Indeed, as illustrated in FIG. 4, the login engine 400 and database 420 can be directly connected by any known or to be known method of connecting and/or enabling communication between such devices and resources.

The principal processor, server, or combination of devices that comprises hardware programmed in accordance with the special purpose functions herein, referred to for convenience as login engine 400, includes a trusted device module 402, request module 404, backend module 406 and authentication module 408. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIGS. 5-7F.

Figure 5:
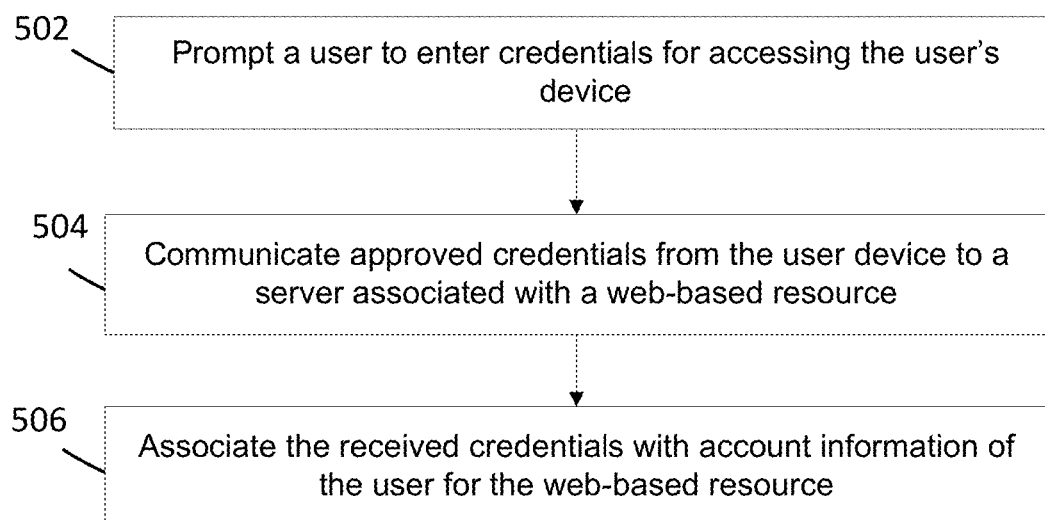
FIG. 5 is a flowchart illustrating steps performed in accordance with some embodiments of the present disclosure.

FIG. 5 is a process 500 diagram illustrating steps performed in accordance with embodiments of the present disclosure for authenticating users on a web-based resource via the user's personal user device (e.g., mobile device).

For purposes of this disclosure, reference to a user's personal device will be made by referring to a user's mobile device; however, it should not be viewed as so limiting, as any type of known or to be known user device can be utilized in place of the user's mobile device. That is, while reference herein is made to a user's device being a mobile device, such device can be any type of device, such as, but is not limited to, a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

Process 500 details the process of registering a user's mobile device with a web-based resource (e.g., a Yahoo!® provided platform, such as Yahoo! Mail®) and registering such device as "trusted" so that authentication of the user on the web-based resource can occur via the user's mobile device. Process 500 is performed by the trusted device module 402 of the login engine 400 of FIG. 4.

Process 500 begins with Step 502 where a user enters his/her login/unlock credentials that are native to the user's mobile device. As discussed above, some devices require a user to enter a PIN or TouchID™ to access or "unlock" a mobile device (such as, iPhone®, iPad®. In some embodiments, such credentials can be a facial recognition input associated with the user's "likeness," as with Android® devices. As such, the login/unlock credentials can be any type of known or to be known input on any type of known or to be known device that grants a user access to such device (or confirms the user's identity).

According to some embodiments, Step 502 may be prompted by a user downloading a dedicated authorization application. That is, a user can download a dedicated authorization application that collects the device's unlock/login credentials. Such collection may occur automatically upon the user downloading and executing the application; and in some embodiments, such collection may be triggered by the user entering such credential information. As discussed in more detail below, the dedicated authorization application can be utilized to receive the user's device credentials upon attempting to access a web-based resource (as in the discussion related to FIGS. 6 and 7C below). Thus, Step 502 requires the user to enter his/her proper device credentials (which are authenticated by the device).

In Step 504, the entered credentials are communicated over a network from the user's mobile device to a server associated with a web-based resource. In some embodiments, Step 504 also involves communicating device identifying information so that the device can be subsequently identified for the user authorization procedure, as discussed in more detail below with reference to FIG. 6. As discussed above and in some embodiments, the communication of the user/device credentials and information may be controlled by the dedicated authorization application that requests, receives and collects the credentials. In some embodiments, Step 504 can involve storing such credentials in database 420.

In Step 506, the credentials of the user device, as well as identifying information of the user device, are associated with the user's account information for the web-based resource. As discussed above, such association is stored in database 420 for retrieval and confirmation. As such, Step 506 involves identifying the user's account information for a web-based resource and associating the user's device credentials with such account information.

By way of a non-limiting example, in accordance with Process 500 of FIG. 5, user Bob desires to authenticate his iPhone® so that he can access web-based resources on his laptop by logging in through his phone (and will no longer be required to remember any passwords for such accounts). Bob downloads from a website, or web-store associated with the web-based resource a dedicated application that can perform the "trust" authorization of his device as discussed herein. For example, Bob can visit the Apple Store® and download the Yahoo!® application that can authorize his access to his Yahoo! Mail® account. Upon downloading the application, Bob is prompted to enter the unlock/login credentials associated/set for his phone. In this example, Bob uses a PIN="1234". Bob enters the numerical string/code: "1234" which is authenticated by Bob's device. This authentication is provided to the authorization application, which then sends such information, as well as identifying information associated with Bob's iPhone®, to the server that hosts the Yahoo! Mail® platform. The mail platform server receives such information, associates Bob's device code with his username for his mail account, and stores such association in a database associated with the mail platform. Therefore, as a result of this authorization, Bob's device is now a "trusted" device which can be used for accessing Bob's Yahoo! Mail® account.

It should be understood that Process 500 can be performed per web service, or per individual applications. That is, for example, Bob can be authenticated for all of Yahoo!®'s services (such as Yahoo! Mail®, Messenger®, Fantasy Football®, and the like) at once via Process 500, or Process 500 can performed for each individual service hosted by Yahoo!®.

Turning now to FIG. 6, process 600 details steps performed in accordance with embodiments of the present disclosure for authenticating users on a web-based resource via the user's mobile device. As discussed above, after user's device is determined to be "trusted" (as in FIG. 5 above), the disclosed systems and methods can capitalize on such trust to login a user to web-based resources, platforms and/or services by enabling the user to authenticate the user's identity on his/her trusted mobile device.

The disclosed systems and methods discussed herein (and in Process 600) involve three components (as illustrated in FIG. 3): 1) a device 302 (such as, but not limited to laptop, workstation, PC) on which the user wants to log in to web-based resource (e.g., the Yahoo!® portal); 2) a backend server 304 delivering content, such as web pages to the device; and the user's mobile device 306. The disclosed systems and methods leverage an association between a user's mobile device being associated with the user's account information for accessing web-based applications. The disclosed systems and methods of Process 600 solve the need for users to have or enter passwords when logging in to a web-based resource (e.g., Yahoo!® portal, site or application) on, for example, a laptop. That is, in place of a password being required to access a web-based resource, a user's mobile device is used to perform the authentication, where the outcome of such authentication is sent to the backend (that hosts the web-based resource) which utilizes such authentication outcome to log the user in on the laptop.

Process 600 will be discussed with reference to FIGS. 3, 4 and 7A-7F; however, it should not be construed as limiting the steps of Process 600 solely to components and examples of such Figures. Additionally, it should be understood that such specific types of devices are not required and the instant disclosure should not be construed to be so limiting. That is, for example, embodiments exist where device 302 can be a mobile device such as an iPad® and device 306 may be a laptop; however, for purposes of simplicity in explanation in the instant disclosure, device 302 will be referred to as a type of personal computer and device 306 will be referred to as a mobile device, as discussed above and below.

Figure 7A:
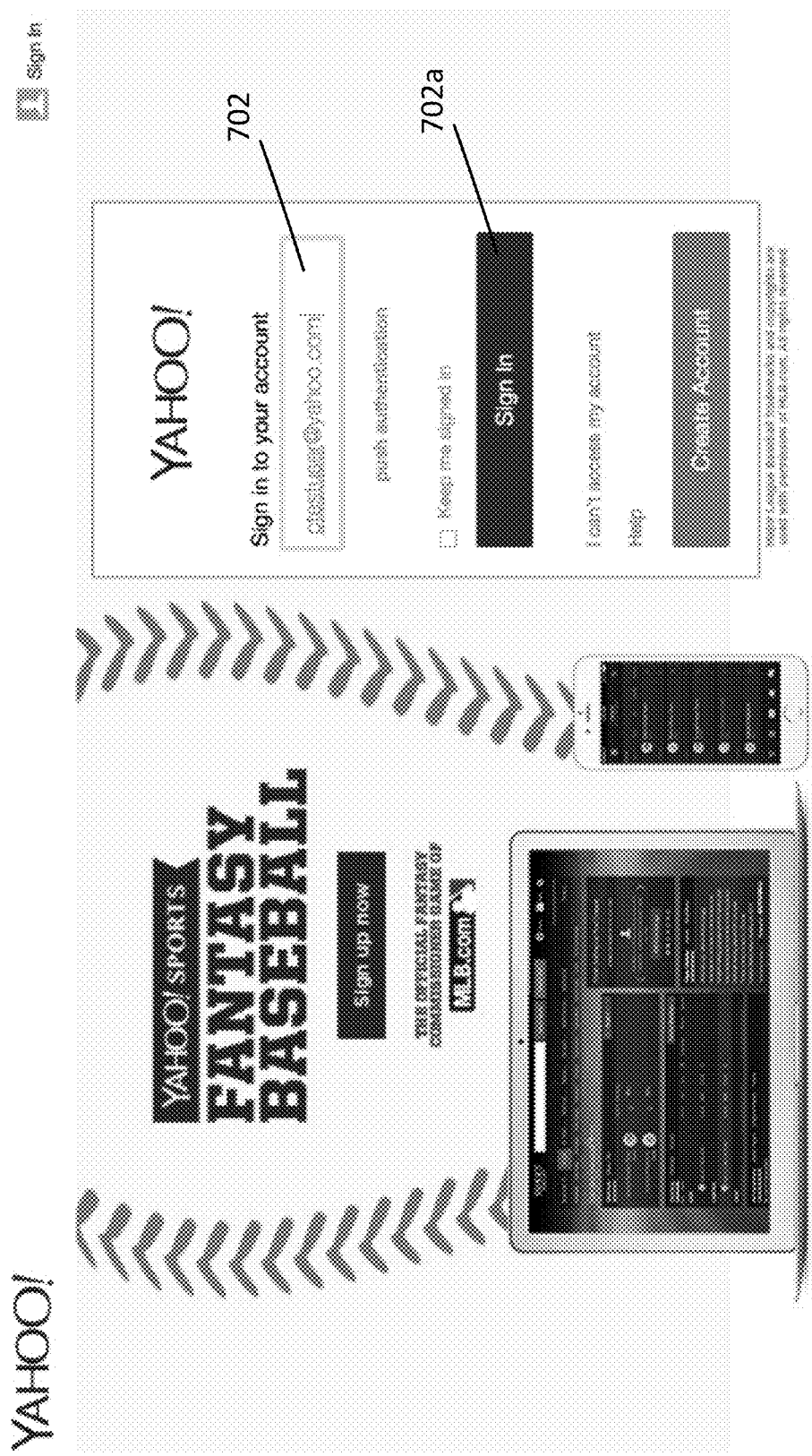
FIGS. 7A-7F illustrate non-limiting example embodiments in accordance with some embodiments of the present disclosure.

Process 600 begins with Step 602 where a user begins the process of logging into a web-based resource by accessing a web-based resource's login page. As discussed above, web-based resources include, and are not limited to, web pages, web sites, web platforms, applications and/or services hosted by backend servers, cloud-based resources, systems and/or platforms, and any other type of online platform, system or service. For purposes of this discussion related to Process 600, reference to a "web-based resource" will be made via reference to the main Yahoo!® portal (as illustrated in FIG. 7A); however, as discussed above, it should not be construed to limit the scope of the instant disclosure to only an online portal, as any and all types of web-based and/or cloud-based services, platforms, applications and the like can be accessed according to the discussion herein.

Step 602 involves a user being presented with a login page at the user's device 302, where the page is provided by a server 304. For example, as illustrated in FIG. 7A, a user is presented with a login page to access the main Yahoo!® portal. As understood by those of skill in the art, such page, as in FIG. 7A typically allows a user to enter a username and password combination in order to gain entry to the site. As discussed herein, according to embodiments of Process 600, a user enters his/her account information (or username 702) and clicks/presses "sign in" 702a (or login). Step 604. As illustrated in FIG. 7A, for example, a user can enter his username 702: ctestuser@yahoo.com (which for this example is an email address).

In Step 606, upon the user clicking the "sign in" button 702a after entering his/her username 702, the device 302 (or web browser or application displaying the page) sends a login request to the server 304. The login request includes at least the user's entered username 702. According to some embodiments, as discussed above, the login request can include login credential information, which can include, but is not limited to, a user's profile information, a username, password, demographic information, biographic information, and the like, or some combination thereof. Steps 602-606 are performed by the request module 404 of the login engine 400 of FIG. 4.

In Step 608, the server 304, upon receiving the login request, performs a search of database 420 based on the received username. Step 608 is performed by the backend module 406 of the login engine 400. The search of Step 608 involves identifying trusted device information stored in database 420 that is associated with the username 702 (as registered from Process 500). As discussed above, the trusted device information can include, but is not limited to, the device's owner information, voice/data carrier information, "unlocking" credentials (for example, PIN or TouchID™), IP address, and/or any other type of information to identify, confirm and/or authenticate a device, or some combination thereof.

Figure 7B:
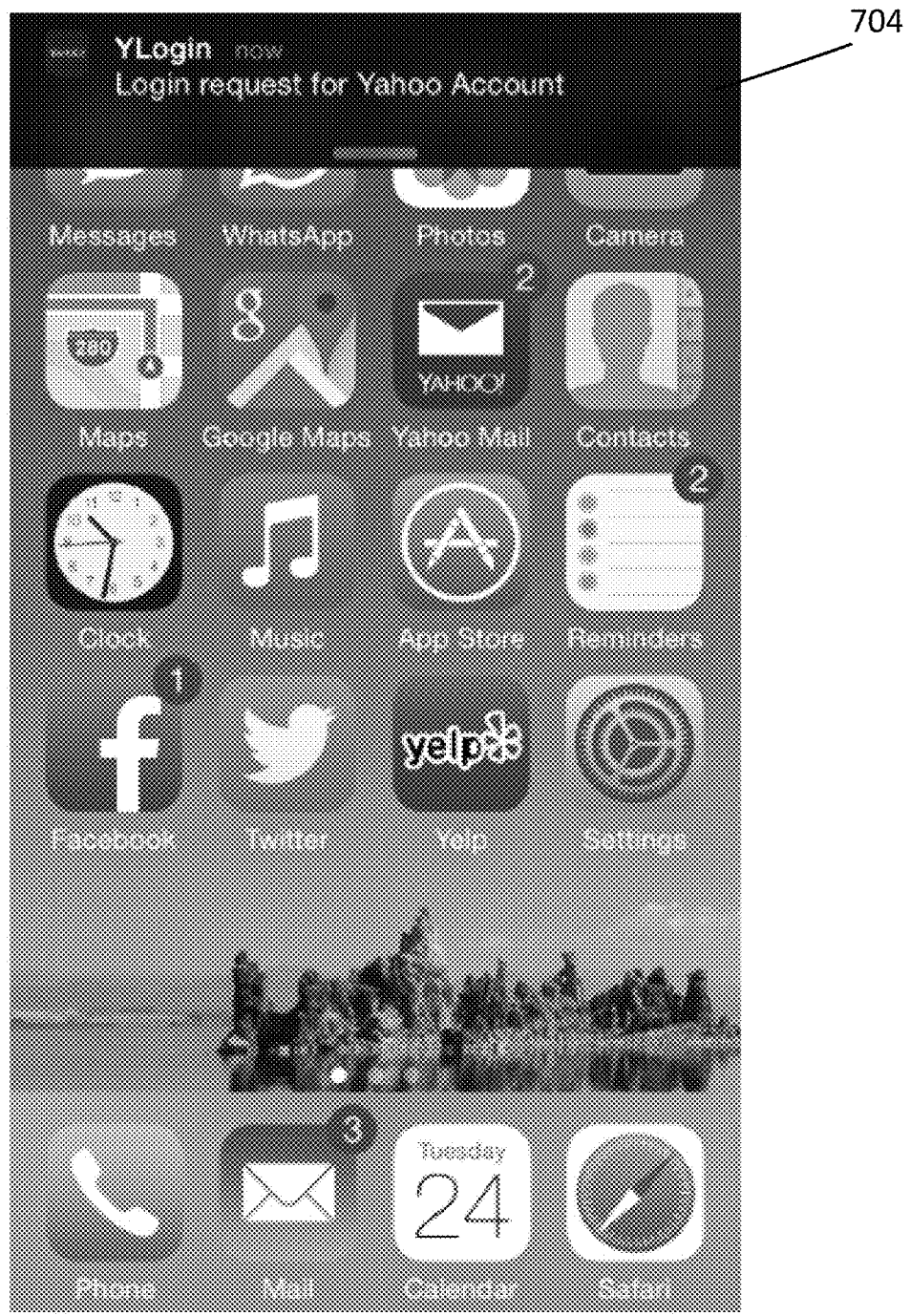
Figure 7C:
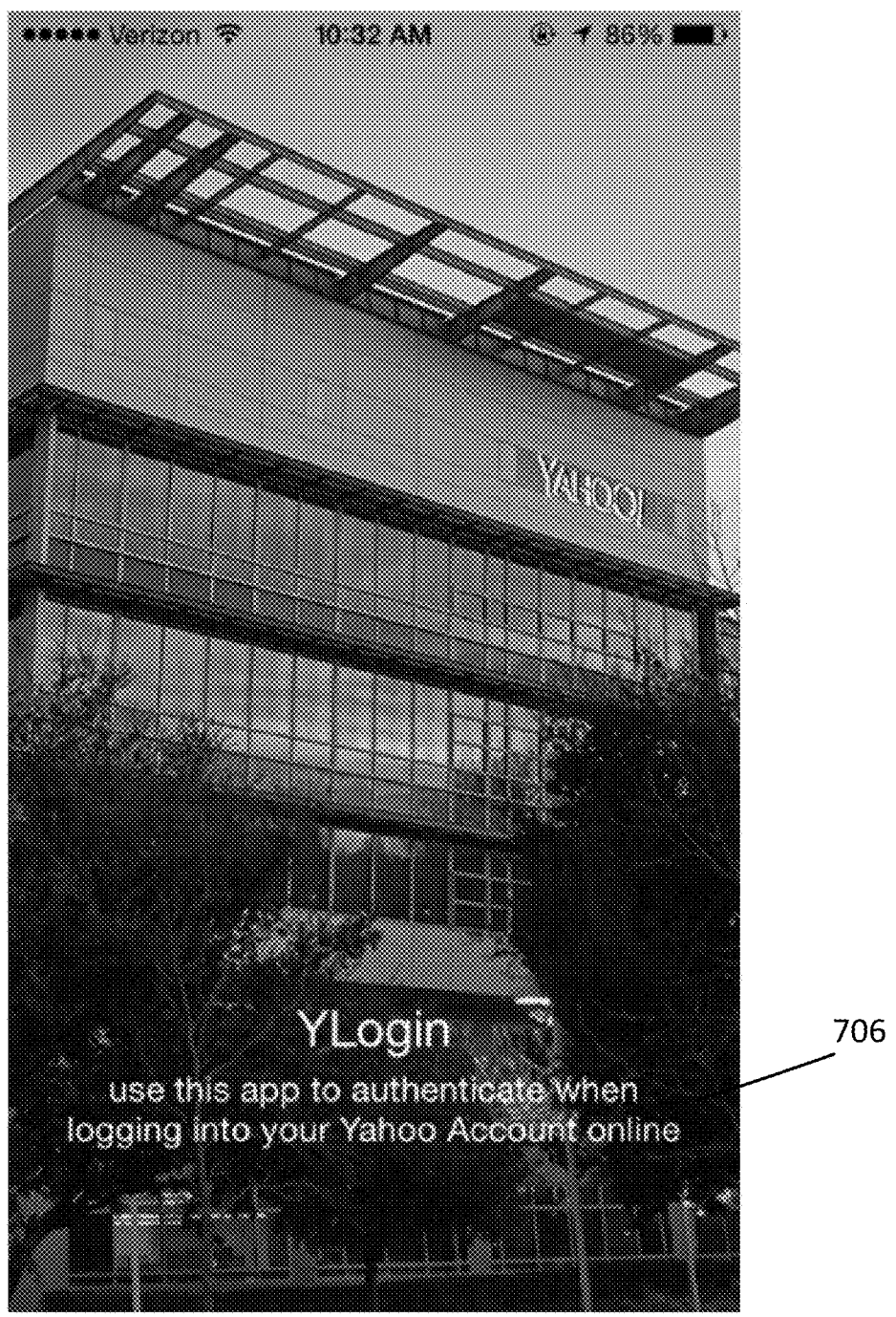

Upon identifying the device associated with the received username, the server 304 sends a push message to the user's mobile device 306. Step 610, which is performed by the backend module 406. As discussed above, the push message can be sent to an application associated with the requested web-based resource, or to the device if configured to receive push notifications. For example, as illustrated in FIG. 7B, a push message can be sent to a user's mobile device 306, whereby an installed Yahoo!® application displays the push message 704 on the device. In some embodiments, as discussed above, the user's mobile device 306 may have installed a dedicated authorization application. For example, as illustrated in FIG. 7C, a push message can be sent to the user's mobile device 306, whereby the installed dedicated authorization application displays the push message 706 (referred to in the figure as YLogin™ which is used to receive device credentials when logging into a Yahoo!® account, as discussed above). In some embodiments, Step 610 further involves determining if an application is installed on the user mobile device 306, and/or what type of application is installed on the device 306, for receiving and handling the push message. In some embodiments, if no application is installed for receiving the push message, the push message may include instructions and/or a location (e.g., Uniform Resource Locator (URL)) for the second device to download the proper application.

Figure 7D:
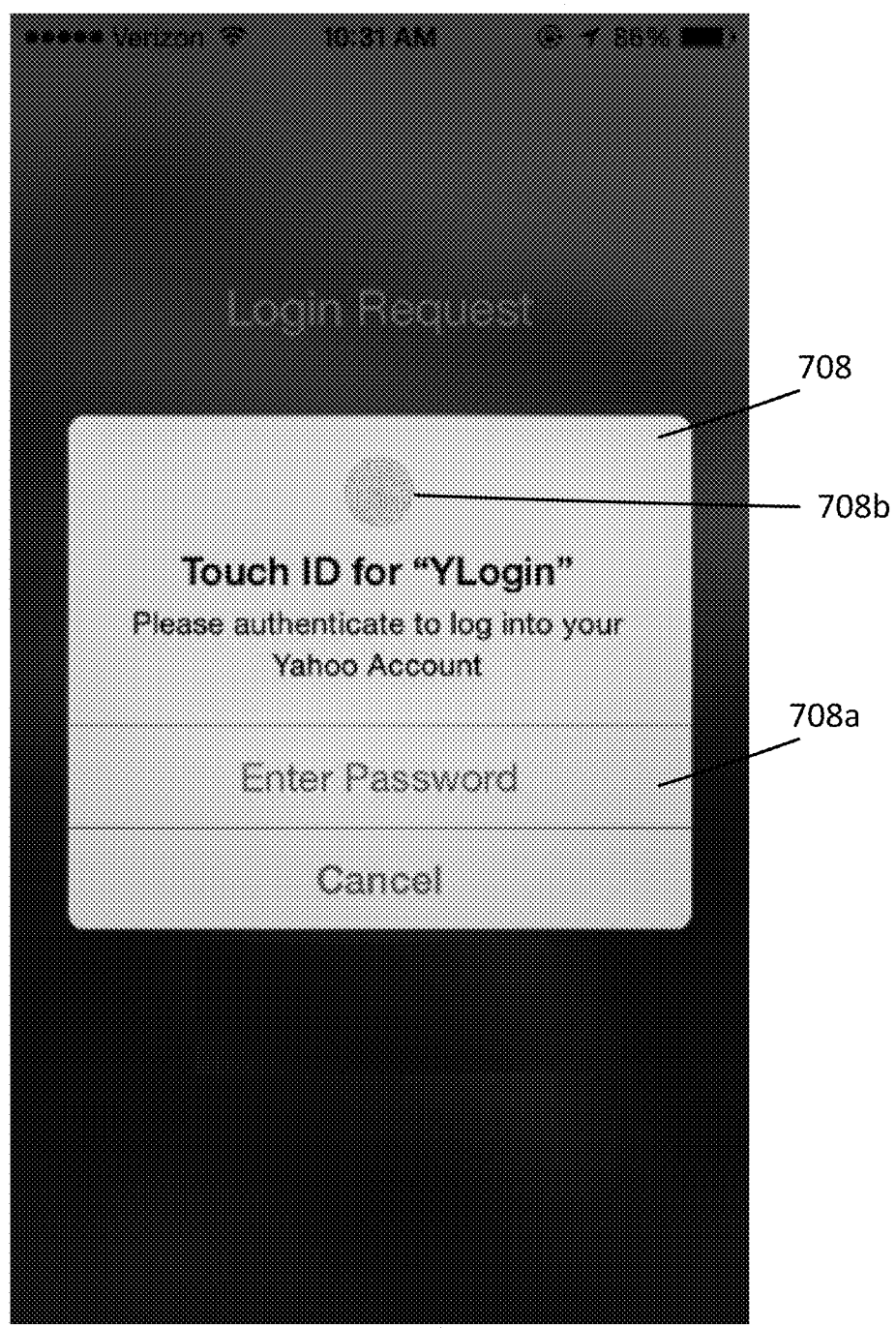

In response to receiving the push message (or notification), the application receiving the message prompts the user to provide the authentication credentials for the mobile device. Step 612, which is performed by the authentication module 408. For example, as illustrated in FIG. 7D, the user is presented with a prompt 708 to enter his password for his device (e.g., PIN) 708a, or his/her biometric information via a TouchID™ 708b. As such, according to some embodiments, as in Step 612, the user can be presented with the option to authenticate his/her login actions by reusing a device's 306 standard login/unlock dialog 708 (as illustrated in FIG. 7D as an example). According to some embodiments, as discussed above, Step 612 may involve the user receiving a unique, one-time, random, separate code only in use for authenticating to the application associated with web-based resource or the dedicated authorization application.

In Step 614, a determination is made as to whether the input credentials from Step 612 were sufficient (or correct). Such determination can involve the application (web-based app or dedicated authorization app) performing the authentication by checking with the mobile device to determine whether the input credential(s) is accurate. Step 614 is performed by the authentication module 408.

Figure 7E:
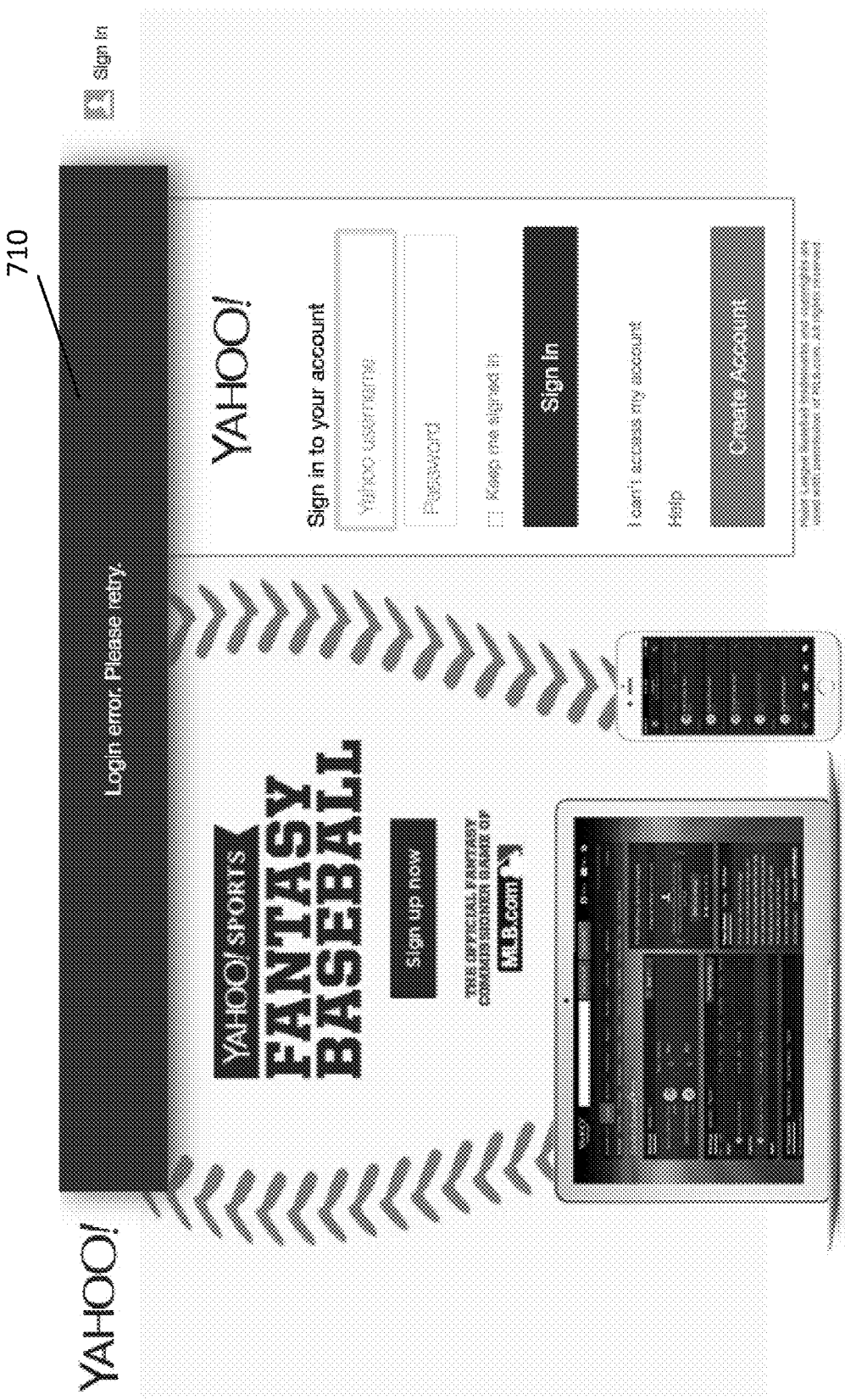
Figure 7F:
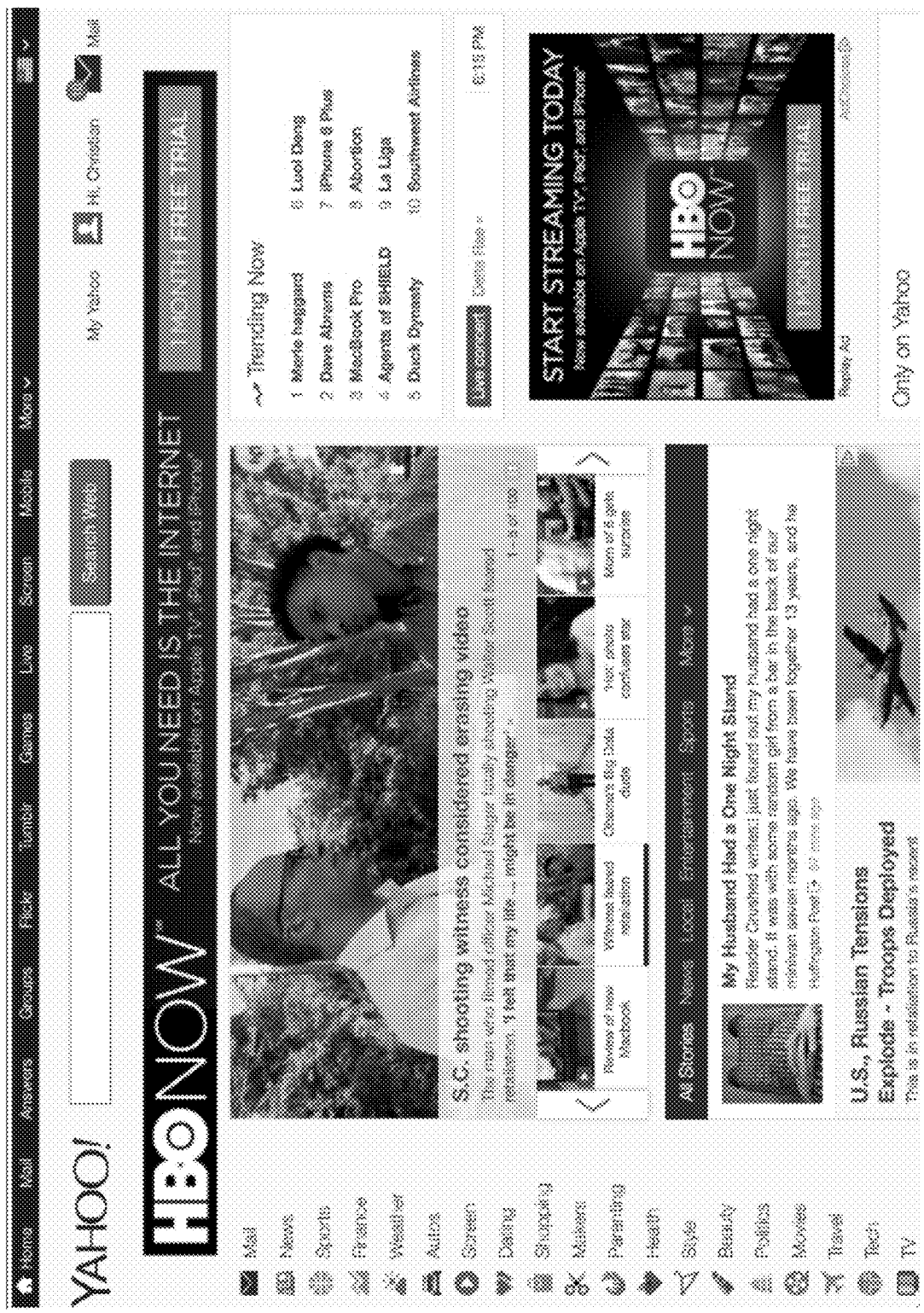

In Step 616, the authorization outcome (or result) from Step 614 is communicated to the backend server 304. If the received outcome includes information that states the authorization from Step 612 was a success, then the server grants access to the web-based resource (e.g., communicates a "logged in" page to the user device 302). Step 618. For example, as illustrated in FIG. 7F, upon the user entering the proper credentials in dialog 708 (708a or 708b), the server 304 sends device 302 the logged in homepage of the Yahoo!® portal. However, in Step 620, if the received outcome includes information that indicates that the authorization from Step 614 was not a success (or the entered credentials were not correct), then, as illustrated in FIG. 7E, the server can communicate a "error" page or message 710 to the device 302 indicating that the login attempt failed (or was insufficient). Steps 616-620 are performed by the authentication module 408.

By way of another non-limiting example, user Bob desires to login to his Tumblr® account and is presented with the Tumblr® login page on his laptop. Bob types his username into a web form in a browser or application running on his laptop. Bob's username is communicated, as an encrypted message, to a backend Tumblr® server which hosts Bob's account information and trusted device information (for his mobile phone). The server then sends Bob's mobile device an encrypted push message which is received by an application running on his mobile device. As above, the application can be, for example, a Tumblr® application or a dedicated authorization application (e.g., YLogin™). In response to receiving the message, Bob is prompted to enter his "unlock/login" credentials associated with his mobile device. Bob enters such information (which can be a PIN, password, biometric information, and the like), and the application/device performs a determination as to whether the information entered by Bob is correct. This determination is communicated back to the server. If the determination (also referred to as outcome) information indicates that Bob's authorization attempt on his mobile device was successful, the server sends Bob's laptop the logged in page for his Tumblr® account. However, if Bob's authentication attempt on his mobile device was unsuccessful, the server sends an error message or error page to Bob's laptop indicating the same.

According to some embodiments, Process 600 can be used to change, modify, reset, access and/or otherwise control a user's settings for his/her account. For example, a user can reset his/her password on a traditional/fallback authentication system. For example, if a user's clicks "forgot password" on the web page of the first device, a push message can be sent to the second device prompting the user to authenticate (in a similar manner discussed above). Upon authentication, the first device could then be triggered to display a web page to the user enabling the user to change his/her password, as the user has been authenticated by the system. While the example above involves resetting a user's password, Process 600 can be applicable to changes in a user's account, the preferences of the account and/or security information associated with an account (i.e., including settings on authentication). For example, if a user's account is set to use the fingerprint scanner on the second device and there is no (traditional) password, the user can effectuate an access request on the first device that enables the user to, for example, "change account settings," change password," revert to password login," "forgot password," and the like, and use the second device to authenticate as discussed above.

FIG. 8 is a work flow 800 for serving relevant advertisements based on the content of the web-based platform/service the user is requesting access to or has gained access to, as in FIGS. 3-7F. Specifically, FIG. 8 illustrates how advertisements are served to a user upon the user logging into a web-based resource based on at least the category or content provided by or hosted by the web-based resource.

For example, if a user is being authenticated for a web-based credit card system in order to access the credit card's travel page, upon the user being granted access to the page, the user can be presented with advertisements for airfares and/or airlines.

In Step 802, a context is determined based on either the content provided by, associated with, derived or extracted from or hosted by the web-based resource, or the type of web-based resource being accessed. This context forms a basis for serving advertisements having a similar context (i.e., relating to the type of content). Thus, Step 802 can involve determining which web-based resource the user is requesting access to, and/or the type of web-based resource. For example, if a user is requesting access to Flickr®, then Step 802 can involve determining a context associated with photos and/or photo albums, as Flickr® is generally known to provide a hosting service for users to upload and view digital content (e.g., images, videos and the like).

In some embodiments, the identification of the context from Step 802 may occur during the login procedure, or after the login procedure discussed above with reference to FIGS. 3-7F, or some combination thereof. In Step 804, the context (e.g., content/context data) is communicated (or shared) from the user's device and/or web-based platform to an advertisement platform comprising an advertisement server 130 and ad database. Upon receipt of the context, the advertisement server 130 performs a search for a relevant advertisement within the associated ad database. The search for an advertisement is based at least on the identified context.

In Step 804, the advertisement server 130 searches the ad database for advertisements that match the identified context. In Step 806, an advertisement is selected (or retrieved) based on the results of Step 804. In some embodiments, the advertisement can be selected based upon the result of Step 804, and modified to conform to attributes of the page or method upon which the advertisement will be displayed, and/or to the device for which it will be displayed. In some embodiments, as in Step 808, the selected advertisement is shared or communicated via the application the user is utilizing to access the web-based resource. In some embodiments, the selected advertisement is sent directly to each user's computing device. The advertisement is displayed in conjunction with the home screen or logged-in screen being displayed to the user.

As shown in FIG. 9, internal architecture 900 of a computing device(s), computing system, computing platform and the like includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing video data for presentation at display 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 902 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a computing device over a network, an access request from a first user device, the access request identifying a secure web-based resource on the network that the first user device wants to access, the secure web-based resource having associated authentication credentials;

identifying, via the computing device, in response to receiving the access request from the first user device, device information of a second user device associated with the user, said second device information comprising an identifier for communicating with said second user device, the second user device being a previously registered device of the user;

communicating, via the computing device, a message to said second user device based on said identifier, said message prompting the second user device to authenticate the user using the second user device's authentication credentials;

receiving, via the computing device over the network, an outcome determination of the authentication of the user from said second user device, said outcome determination indicating that the user is authenticated using the second user device's authentication credentials; and communicating to the first user device, via the computing device, a response to the access request determined using the received outcome determination in place of authenticating the user based on the secure web-based resource's associated authentication credentials, said response enabling the first user device access to the secure web-based resource on the network based on said outcome determination indicating that the user is authenticated using the second user device's authentication credentials.

2. The method of claim 1, further comprising:

determining that an application is installed on the second user device to receive the message and display said message prompt.

3. The method of claim 2, wherein said application is a dedicated application configured to receive said message, display said prompt and determine said outcome determination.

4. The method of claim 2, wherein said application is associated with the web-based resource and is configured to receive said message, display said prompt and determine said outcome determination.

5. The method of claim 1, wherein said authentication is based on at least one of a PIN and biometric information.

6. The method of claim 1, wherein said message communicated to the second user device is a push message.

7. The method of claim 1, wherein said message communicated to the second user device is an encrypted message.

8. The method of claim 1, wherein said second user device is a personal mobile device of the user.

9. The method of claim 1, wherein said access request comprises an identifier associated with the user.

10. The method of claim 1, wherein said access request comprises an indication from the user related to controlling security information set up by the user related to accessing the secure web-based resource, wherein said response enables the user to control said security information.

11. A non-transitory computer-readable storage medium tangibly encoded with computer-executable instructions, that when executed by a processor associated with a computing device, performs a method comprising:
   receiving an access request from a first user device, the access request identifying a secure web-based resource on the network that the first user device wants to access, the secure web-based resource having associated authentication credentials;
   identifying, in response to receiving the access request from the first user device, device information of a second user device associated with the user, said second device information comprising an identifier for communicating with said second user device, the second user device being a previously registered device of the user;
   communicating a message to said second user device based on said identifier, said message prompting the second user device to authenticate the user using the second user device's authentication credentials;
   receiving an outcome determination of the authentication of the user from said second user device, said outcome determination indicating that the user is authenticated using the second user device's authentication credentials; and
   communicating, to the first user device, a response to the access request determined using the received outcome determination in place of authenticating the user based on the secure web-based resource's associated authentication credentials, said response enabling the first user device access to the secure web-based resource on the network based on said outcome determination indicating that the user is authenticated using the second user device's authentication credentials.

12. The non-transitory computer-readable storage medium of claim 11, further comprising:
   determining that an application is installed on the second user device to receive the message and display said message prompt.

13. The non-transitory computer-readable storage medium of claim 11, wherein said authentication is based on at least one of a PIN and biometric information.

14. A system comprising:
   a processor; and
   a non-transitory computer-readable storage medium for tangibly storing thereon program logic for execution by the processor, the program logic comprising:
      receiving logic executed by the process for receiving an access request from a first user device, the access request identifying a secure web-based resource on the network that the first user device wants to access, the secure web-based resource having associated authentication credentials;
      identifying logic executed by the process for identifying, in response to receiving the access request from the first user device, device information of a second user device associated with the user, said second device information comprising an identifier for communicating with said second user device, the second user device being a previously registered device of the user;
      communication logic executed by the process for communicating a message to said second user device based on said identifier, said message prompting the second user device to authenticate the user using the second user device's authentication credentials;
      receiving logic executed by the process for receiving an outcome determination of the authentication of the user from said second user device, said outcome determination indicating that the user is authenticated using the second user device's authentication credentials; and
      communication logic executed by the process for communicating, to the first user device, a response to the access request determined using the received outcome determination in place of authenticating the user based on the secure web-based resource's associated authentication credentials, said response enabling the first user device access to the secure web-based resource on the network based on said outcome determination indicating that the user is authenticated using the second user device's authentication credentials.

15. The method of claim 1, wherein said response comprises an error message when said outcome determination indicates that said authentication is insufficient to permit access to the second user device.

16. The non-transitory computer-readable storage medium of claim 11, wherein said response comprises an error message when said outcome determination indicates that said authentication is insufficient to permit access to the second user device.

17. The system of claim 14, wherein said response comprises an error message when said outcome determination indicates that said authentication is insufficient to permit access to the second user device.

* * * * *